UNITED STATES PATENT OFFICE.

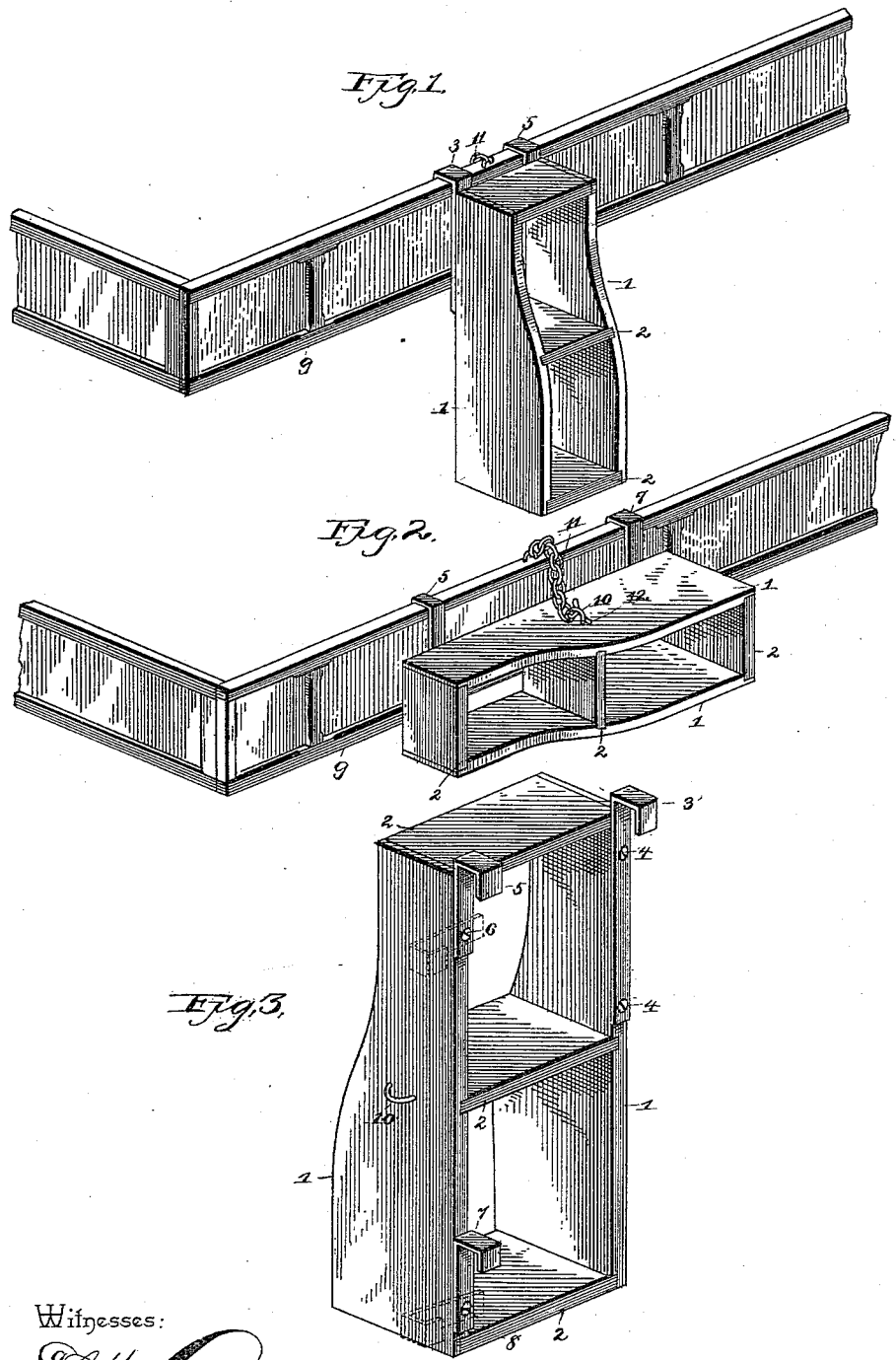

AUGUSTUS COLBERT, OF TAYLOR, LOUISIANA.

VEHICLE-STEP.

SPECIFICATION forming part of Letters Patent No. 420,143, dated January 28, 1890.

Application filed October 9, 1889. Serial No. 326,436. (No model.)

*To all whom it may concern:*

Be it known that I, AUGUSTUS COLBERT, a citizen of the United States, residing at Taylor, in the parish of Bienville and State of Louisiana, have invented a new and useful Vehicle-Step, of which the following is a specification.

This invention has relation to steps for passenger-vehicles, and among the objects in view are to provide a suitable step adapted to be removably connected to the side thereof either in a vertical position, as when receiving or discharging passengers, or in a horizontal position, as when the vehicle is traveling.

With these general objects in view the invention consists in certain features of construction hereinafter specified, and particularly pointed out in the claims.

Referring to the drawings, Figure 1 is a perspective of a side rail of a body provided with a step constructed in accordance with my invention. Fig. 2 is a similar view, the step being suspended as for traveling. Fig. 3 is a rear perspective of the step detached.

Like numerals of reference indicate like parts in all the figures of the drawings.

The step essentially comprises opposite side rails or bars 1, gradually inclined or widened toward their lower ends, and between said side rails or bars are mounted in any suitable manner two or more steps 2, decreasing in width toward the upper end of the series. Upon the rear face and near the upper end of one of the side bars is a rigid hook 3, the shank of the hook extending along the rear face of the rail for a considerable distance, and securely secured thereto by means of screws 4, passed through the shank and into the bar or rail. Upon the opposite bar of the step and upon its rear upper end there is mounted a second hook 5, pivotally connected to the bar by means of a single bolt or screw 6, the shank of this hook being considerably less than that of the companion hook and adapted to be turned, so as to project the hook either laterally or in line with the ladder or step. At the opposite end of the same bar upon which is pivoted the hook 5 there is pivoted a companion duplicate hook 7 by means of a screw or bolt 8, which hook, like its companion hook 5, is designed to be swung laterally or into line with the step. By swinging both the hook 5 and its companion 7 outwardly at a right angle to the bar 1 the ends of the hooks may be introduced over the upper edge of the side rail 9 of the wagon or other vehicle, and thus be conveniently carried. To further secure the step, I may, if desired, provide the side bar of the step with a lateral eye or staple 10, adapted to receive and interlock with a loosely-depending chain 11, carrying a locking or cross pin 12. The location of the step when in this position is sufficiently convenient to the driver in most constructions of vehicles to enable him to reach back and detach the lower hook 7 and permit that end to drop by gravity, the rigid hook 3 being elevated to such a position as to adapt it to engage the side rail, which may be accomplished by the driver or passenger, and the step will be in a position between the wheels to either receive or discharge passengers.

It will be noticed that when the step is hung up and not in use the same is above the plane of the front wheel, and therefore cannot be struck by the wheel when the vehicle is turning. It can also be slid along, so as not to interfere with the rear wheel.

Having described my invention, what I claim is—

1. A step for vehicles, comprising opposite bars and an intermediate series of steps, a fixed hook at the upper rear end of one of the bars, and a pair of pivoted hooks at the upper and lower rear faces of the opposite bar, substantially as specified.

2. The combination, with the side bars, one of which is provided at its upper end with the stationary hook 3 and the other with the pivoted hooks 5, and arranged at opposite ends of said bar, of the side rail 10, adapted to engage either the two pivoted hooks or the stationary hook and the opposite pivoted hook, substantially as specified.

3. The herein-described step, comprising opposite side bars, one of which is provided at opposite ends with a pair of hooks adapted to engage the side rail of a vehicle when the step is not in use, substantially as specified.

In testimony that I claim the foregoing as my own I have hereto affixed my signature in presence of two witnesses.

AUGUSTUS COLBERT.

Witnesses:
GEORGE M. SHAFFER,
M. F. RENO.